Patented Nov. 25, 1947

2,431,463

UNITED STATES PATENT OFFICE 2,431,463

VITAMIN B₆ INTERMEDIATES

Gustaf H. Carlson and Frederick J. Pilgrim, Pearl River, N. Y., assignors, by mesne assignments, to American Cyanamid Company, New York, N. Y., a corporation of Maine No Drawing. Application June 25, 1942, Serial No. 448,495

7 Claims. (Cl. 260—295.5)

This invention relates to new chemical compounds and more particularly it relates to an intermediate for use in the preparation of vitamin B₆ and to a process of preparing the same.

The compounds made in accordance with the present invention may be represented by the following formula:

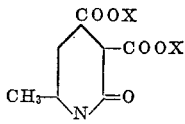

in which X represents an alkyl, aryl, aralkyl, cycloaliphatic, or heterocyclic radical.

The invention will be illustrated in more detail in conjunction with the following specific examples.

*Preparation of 2-methyl-4,5-dicarboxy-pyridone-6*

A suspension of 5 g. of the amide of 2-methyl-4-carboxy-5-cyanopyridone-6 in 50 cc. of concentrated hydrochloric acid was treated, at 0° C., with a solution of 1.95 gr. of sodium nitrite in 10 cc. of water. After thirty minutes, at 0° C., the solution was heated on a steam bath for forty-five minutes, solvent was removed in vacuo and the residue (4.9 g.) was extracted with acetone. The filtered solution was concentrated, then diluted with ether and yielded 2.2 g. of the dicarboxylic acid, M. P. 211–213° C. with decomposition, which, after recrystallization, melted at 222° C. with decomposition.

The amide employed in the above example may be prepared by treating 2-methyl-4-carbethoxy-5-cyanopyridone-6 with alcoholic ammonia.

The conditions for bringing about the hydrolysis may be varied and acids other than nitrous acid, such as for example sulfuric, sulfurous, hydrochloric, etc., may be employed for hydrolyzing the cyano and amide groups, it being understood that the above specific example merely represents an hydrolysis employing the preferred acid and conditions.

*Preparation of dimethyl ester of 2-methyl-4,5-dicarboxy pyridone-6*

A suspension of 1 g. of 2-methyl-4,5-dicarboxy pyridone-6 in 10 cc. of methanol was treated with a solution of 3 gr. of hydrogen chloride in 20 cc. of methanol at 0° C. and, after seventy-two hours at room temperature, solvent was distilled in vacuo. The residue was recrystallized and yielded 0.7 g. of the dimethyl ester, M. P. 173–175° C. uncorr.

In the foregoing specific example the dimethyl ester was produced and is the preferred ester because of its cheapness. It is to be understood, however, that instead of the dimethyl ester various other esters may be produced. Among the various esters that may be produced are the alkyl esters, such as ethyl, propyl, butyl, amyl, hexyl, and the like; the aromatic esters, such as phenyl and naphthyl; the aralkyl esters, such as the benzyl and the ester of 2-hydroxymethylnaphthalene, cinnamyl alcohol, etc.; the esters derived from cycloaliphatic alcohols, such as cyclohexanol, methyl cyclohexanol, fenchyl alcohol, or the like. Similarly, the esters derived from heterocyclic alcohols, for example furfurol alcohol, tetrahydrofurfurol alcohol, or those derived from nitro alcohols such as 2-nitro-2-methyl-1-propanol are not precluded from the present invention.

It is obvious that the description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

The 2-methyl-4,5-dicarboxy pyridone-6 used as an intermediate in the present application is claimed in our copending application, Serial No. 448,496, filed on June 25, 1942.

We claim:

1. The process which comprises reacting 2-methyl-4,5-dicarboxy-pyridone-6 with an alcohol to produce a di-ester of 2-methyl-4,5-dicarboxy-pyridone-6 and recovering the said ester.

2. The process which comprises reacting 2-methyl-4,5-dicarboxy pyridone-6 with methyl alcohol to produce the di-methyl ester of 2-methyl-4,5-dicarboxy pyridone-6 and recovering the said ester.

3. A di-ester of 2-methyl-4,5-dicarboxy pyridone-6.

4. A dialkyl ester of 2-methyl-4,5-dicarboxy pyridone-6.

5. The di-methyl ester of 2-methyl-4,5-dicarboxy pyridone-6.

6. The process of preparing the di-methyl ester of 2-methyl-4,5-dicarboxy pyridone-6 which comprises suspending one part of 2-methyl-4,5-dicarboxy pyridone-6 in an excess of methanol, adding approximately about three parts of hydrogen chloride, dissolved in cold methanol, allowing the mixture to stand for approximately about three days at not in excess of room temperature, removing the solvent and acid by distillation in vacuo, and recovering the said ester.

7. The process which comprises reacting 2-methyl-4,5-dicarboxy pyridone-6 with methyl alcohol in the presence of hydrogen chloride to produce the di-methyl ester of 2-methyl-4,5-dicarboxy pyridone-6 and recovering the said ester.

GUSTAF H. CARLSON.
FREDERICK J. PILGRIM.

REFERENCES CITED

The following references are of record in the file of this patent:

FOREIGN PATENTS

| Number | Country | Date |
|---|---|---|
| 457,621 | Great Britain | 1935 |

OTHER REFERENCES

Groggins, "Unit Processes in Organic Synthesis," p. 544 (1938), McGraw-Hill.

Maier, "Das Pyridin und Seine Derivatives," 1934, p. 213.

Annalen de Chemie, 487, pp. 127-34.

Karrer, "Organic Chemistry," pages 199, 168 (1938).

Beilstein, vol. 22, 4 ed., page 269.

"Chemistry of Organic Compounds," Conant (1934), MacMillan, page 195.

Berichte, de deut. Gess., 72 (1939), page 309.

Science Papers, Institute of Phys. Chem. Research, Tokyo, vol. 3 (1939), pages 173-7, vol. 35 (1931), pp. 347-352.

J. Amer. Chem. Soc. (1939), vol. 61, pp. 1242-5.

J. Chem. Soc., 1929, p. 2223.